United States Patent [19]

Heinrichs et al.

[11] Patent Number: 5,306,437
[45] Date of Patent: Apr. 26, 1994

[54] COPOLYMERS AND THEIR USE AS LUBRICANTS AND RELEASE AGENTS FOR PROCESSING THERMOPLASTICS

[75] Inventors: Franz-Leo Heinrichs, Gablingen; Gerd Hohner, Gersthofen; Anton Lukasch, Meitingen; Jan-Peter Piesold, Augsburg, all of Fed. Rep. of Germany

[73] Assignee: Hoechst Aktiengesellschaft, Frankfurt am Main, Fed. Rep. of Germany

[21] Appl. No.: 108,887

[22] Filed: Aug. 18, 1993

Related U.S. Application Data

[62] Division of Ser. No. 981,553, Nov. 25, 1992, abandoned.

[30] Foreign Application Priority Data

Nov. 30, 1991 [DE] Fed. Rep. of Germany ....... 4139601

[51] Int. Cl.⁵ ........................................... C10M 145/10
[52] U.S. Cl. .................................. 252/56 R; 252/56 S; 526/318.45
[58] Field of Search ............................. 252/56 R, 56 S

[56] References Cited

U.S. PATENT DOCUMENTS

| | | |
|---|---|---|
| 2,892,783 | 6/1959 | Stuart et al. . |
| 3,201,374 | 8/1965 | Simms et al. . |
| 3,755,272 | 8/1973 | Blank . |
| 4,029,682 | 6/1977 | Foulks . |
| 4,184,993 | 1/1980 | Singh . |
| 4,334,038 | 6/1982 | Beck et al. . |
| 4,399,248 | 8/1983 | Singh et al. . |
| 4,438,008 | 3/1984 | Oeder et al. . |
| 4,749,505 | 6/1988 | Chung et al. ............... 252/56 R |
| 4,758,364 | 7/1988 | Seki et al. ................... 252/56 R |
| 4,853,139 | 8/1989 | Ichihashi ..................... 252/56 R |
| 4,966,722 | 10/1990 | Smith, Jr. ................... 252/56 R |
| 5,026,496 | 6/1991 | Takigawa et al. ........... 252/56 R |
| 5,049,291 | 9/1991 | Miyaji et al. ............... 252/56 R |
| 5,068,047 | 11/1991 | Chung et al. ............... 252/56 R |

FOREIGN PATENT DOCUMENTS 1292548 10/1972 United Kingdom .
1450273 9/1976 United Kingdom .

*Primary Examiner*—Joseph L. Schofer
*Assistant Examiner*—N. Sarofim

[57] ABSTRACT

Copolymers prepared by free radical polymerization of a $C_{12}$—$C_{60}$-α-olefin with a carboxylic acid of the formula $CH_2=CR^1$—COOH, a carboxylic acid ester of the formula $CH_2=CR^1$—$COOR^2$ and, if appropriate, a styrene compound prove to be highly active lubricants and release agents in polymers, in particular in polyvinyl chloride, which scarcely influence the transparency of the polymers.

8 Claims, No Drawings

COPOLYMERS AND THEIR USE AS LUBRICANTS AND RELEASE AGENTS FOR PROCESSING THERMOPLASTICS

This is a division of our copending application Ser. No. 07/981,553, filed Nov. 25, 1992, now abandoned.

DESCRIPTION

The present invention relates to copolymers of α-olefins, unsaturated carboxylic acids, unsaturated carboxylic acid esters and, if appropriate, styrene, and to the use of such copolymers as auxiliaries for processing thermoplastics.

Lubricants which on the one hand are said to improve the flow properties of the polymer melt and on the other hand are said to reduce the tendency of the melt to stick to the metallic components of processing machines are usually employed for processing thermoplastics. Lubricants have particular importance in the processing of polyvinyl chloride, since this plastic cannot be processed without lubricants because of its sensitivity toward exposure to high temperatures and toward shearing forces, as well as its pronounced tendency to stick.

A distinction is made between lubricants which are readily compatible with the polymer melt and therefore chiefly have the effect of improving flow (internal lubricants) and those which are incompatible to a greater or lesser degree, and therefore become enriched at phase boundaries and display, for example, a release action there (external lubricants).

A large number of inexpensive, readily accessible products are available for improving the flow properties of polyvinyl chloride melts. Examples which may be mentioned here are fatty alcohols, fatty acids, fatty acid partial esters and fatty acid amides.

The choice of suitable external lubricants for PVC presents problems, since these sometimes must meet contradictory requirements. In order to be active, suitable lubricants must have a certain incompatibility with the PVC melt, so that a film having a releasing action can form between the melt and the metal components of the processing machines. However, incompatible additives have the disadvantage that they often cause severe clouding on the end product. Given the numerous uses for which a highly transparent end product is desired, the permitted amount used of a release agent is therefore often limited to the extent that its action is no longer adequate. These problems have a particularly adverse effect in the production of thin PVC calendered film, since the tendency to stick and the low mechanical resistance of such films in the hot state requires the use of a large amount of lubricant for detachment from the rolls, but on the other hand particularly high transparency requirements are imposed on such films, for example in the packaging sector.

Known lubricants for the production of plasticizer-free PVC films are on the one hand montan wax and on the other hand practically neutral mixed esters of aliphatic, cycloaliphatic or aromatic dicarboxylic acids having 2 to 22 carbon atoms, aliphatic polyols having 2 to 6 hydroxyl groups and aliphatic monocarboxylic acids having 12 to 30 carbon atoms with hydroxyl or acid numbers of 0 to 6 (cf. GB 1,292,548), as well as practically neutral mixed esters of aliphatic diols, aliphatic, cycloaliphatic or aromatic polycarboxylic acids having 2 to 6 carboxyl groups and aliphatic monofunctional alcohols with 12 to 30 carbon atoms (cf. GB 1,450,273).

Soaps and soap esters which are prepared from long-chain carboxylic acids which are accessible by free radical addition of short-chain monocarboxylic acids, preferably of propionic acid, onto long-chain α-olefins having 22 to 100 carbon atoms are furthermore known (cf. U.S. Pat. No. 4,029,682). Although the soaps and soap esters thus obtained are excellent lubricants and release agents for plastics processing, their preparation requires a two- or three-stage preparation process, which leads to these products becoming more expensive. It would therefore be advantageous if suitable lubricants and release agents could be arrived at directly in one reaction step.

Lubricants and release agents for chlorine-containing thermoplastics prepared by copolymerization of acrylic acid, acrylic acid esters, maleic acid or maleic acid esters with ethylene are also described (cf. U.S. Pat. No. 4,438,008). Although these lubricants and release agents are accessible in one reaction step and have a good compatibility and release action in PVC, the copolymerization requires high pressures and temperatures, and therefore specifically designed apparatuses.

Finally, copolymers of o-olefins having more than 30 carbon atoms and maleic acid or maleic acid esters are known (cf. U.S. Pat. No. 4,334,038). Although these lubricants are accessible in one reaction step without specifically designed apparatuses and have a high release action, they do not yet have an action in PVC which is universally satisfactory.

The montan waxes, which are very advantageous from the applications point of view, are limited to industrially demanding fields because of their high cost. The known mixed esters cause relatively severe clouding in modified polyvinyl chloride even at a lower dosage, and are unsuitable as lubricants and release agents for production of particularly high-quality low temperature (LT) films (®Luvitherm films), in which 2 to 4 parts of lubricant and release agent are employed per 100 parts of EPVC.

There was therefore the object of providing lubricants and release agents which on the one hand have the positive properties of the montan waxes, such as, for example, their usability in LT films, and which on the other hand are accessible in a simple and economical manner.

The lubricants and release agents according to the invention are copolymers of α-olefins, unsaturated carboxylic acids and unsaturated carboxylic acid esters, and, if appropriate, vinylaromatic compounds of the styrene type.

Possible α-olefins are those having a chain length of 12 to 60, preferably 18 to 60, particularly preferably 24 to 60 carbon atoms. Both olefins having pure chains and olefin mixtures such as are obtained, for example, as distillation cuts or distillation residues in the known preparation processes can be employed. Industrial α-olefin mixtures, in particular those having a relatively high chain length, can contain, in addition to 1-alkenes, larger or smaller amounts of internal and lateral olefinic double bonds (vinylidene and vinylene groups).

The unsaturated carboxylic acids employed according to the invention are compounds of the general formula $CH_2=CR^1-COOH$, in which $R^1$ is a hydrogen atom or a methyl group, i.e., for example, acrylic or methacrylic acid. The unsaturated carboxylic acid esters used are compounds of the general formula $CH_2=CR^1-COOR^2$, in which $R^1$ has the above meaning and $R^2$ is a straight-chain or branched alkyl radical having 1 to 6 carbon atoms. The methyl and ethyl esters of acrylic or methacrylic acid are preferred, and the methyl ester of acrylic acid is particularly preferred.

Vinylaromatic compounds which can be employed are styrene, 3-methylstyrene, 4-methylstyrene or α-methylstyrene. It is also possible to employ several of the carboxylic acids, carboxylic acid esters and, if appropriate, styrenes mentioned.

The lubricants according to the invention are prepared in a manner which is known per se, by reaction of the starting monomers under the catalytic action of small amounts of organic peroxides in the presence or in the absence of an inert solvent. Polymerization in the absence of a solvent is preferred. A mixture of carboxylic acid, carboxylic acid ester and free radical initiator, for example, can be added dropwise, at elevated temperature and while stirring, to the α-olefin which has been initially introduced into the reaction vessel. When the reaction has ended, unreacted monomers and volatile dissociation products of the peroxide can be removed by distillation. Organic peroxides are preferably employed as the free radical initiators. The reaction temperature here is to be matched to the dissociation characteristics of the particular peroxide used. At a temperature of 100° to 160° C., for example, dialkyl peroxides, such as di-t-butyl peroxide, or diaroyl peroxides, such as dibenzoyl peroxide, are particularly suitable. The molar ratio of the monomer components and therefore the chemical build-up and the polarity of the copolymers can be adjusted within wide limits. There is therefore the possibility of matching the properties of the lubricant to the particular application requirements in an optimum manner.

| α-olefin | 20 to 99.5, preferably 40 to 95% by weight, |
|---|---|
| unsaturated carboxylic acid | 0.1 to 50, preferably 0.5 to 30% by weight, |
| unsaturated carboxylic acid ester | 0.1 to 60, preferably 1.0 to 40% by weight, |
| styrene compound | 0.0 to 30, preferably 0.0 to 20% by weight. |

The reaction temperature is 70 to 180, preferably 90° to 160° C., the reaction pressure is 1.0 to 5.0, preferably 1.0 to 1.5 bar, and the reaction time is 0.5 to 20, preferably 1 to 7 hours.

The copolymers according to the invention are employed as lubricants and release agents in thermoplastic molding compositions, for example in polyvinyl chloride, which can be prepared by the known processes—for example suspension, bulk or emulsion polymerization—and copolymers of vinyl chloride with up to 30% by weight of comonomers such as, for example, vinyl acetate, vinylidene chloride, vinyl ethers, acrylonitrile, acrylic acid esters, maleic acid mono- or diesters or olefins, and in graft polymers of polyvinyl chloride and polyacrylonitrile. Polyvinyl chloride, polyvinylidene chloride, ethylene/vinyl acetate copolymers, polyacrylonitrile, copolymers of vinyl chloride and vinyl acetate, and graft polymers derived therefrom, or mixtures of the above-mentioned thermoplastics are preferred. Those copolymers according to the invention which have a low carboxylic acid content and a high ester content exhibit particularly advantageous properties when used for processing PVC. Too high a carboxylic acid content has an adverse effect on the color properties of the lubricants, especially in Ca/Zn-stabilized PVC. Because of its effect of increasing compatibility with the PVC, a high ester content leads to better transparency properties, better flow properties of the PVC melt and a shorter delay in plasticization of the PVC.

The amount added is 0.05 to 5% by weight, based on the polymer. If the molding composition is based on B- or S-PVC, the amount added is preferably 0.05 to 1% by weight, and if it is based on E-PVC, the amount added is preferably 1.0 to 5, in particular 2 to 4% by weight, in each case based on the polymer. The copolymers according to the invention are mixed into the polymers in the customary manner during preparation or processing of the molding compositions.

In addition to the copolymers according to the invention, the plastics molding composition can additionally comprise fillers, heat stabilizers, light stabilizers, antistatics, flameproofing agents, reinforcing substances, pigments, dyestuffs, processing auxiliaries, lubricants, impact modifiers, antioxidants, blowing agents and optical brighteners in the customary amounts.

The examples which follow are intended to illustrate the invention.

The acid and hydrolysis numbers and the dropping points were determined by DGF standard methods M-IV 2 (57) and M-III 3 (75) respectively (standards of the Deutsche Gesellschaft fur Fettwissenschaft e.V.). The melt viscosities were measured with the aid of a rotary viscometer.

EXAMPLE 1

Preparation of a $C_{24}-C_{60}$-α-olefin/acrylic acid/methyl acrylate copolymer:

500 g of a commercially available $C_{24}-C_{60}$-α-olefin cut were initially introduced into a five-necked flask fitted with a thermometer, stirrer, dropping funnel and reflux condenser, and were heated to 140° C. A mixture of 219.0 g of methyl acrylate, 10.0 g of acrylic acid and 5.0 g of di-t-butyl peroxide was added dropwise at this temperature in the course of 5 hours, while stirring. When the dropwise addition had ended, the mixture was allowed to after-react for a further 30 minutes, and volatile constituents were distilled off under a vacuum of about 15 mbar at a bath temperature of 170° C. The colorless reaction product, which solidifies in the form of a wax, was poured into dishes.

Physical data: acid number 11 mg of KOH/G; hydrolysis number about 160 mg of KOH/G; dropping point 70° C.; melt viscosity 520 mPa.s (measured at 90° C.).

EXAMPLE 2

Preparation of a 1-tetradecene/acrylic acid/methyl acrylate copolymer 196.0 g of 1-tetradecene, 131.7 g of methyl acrylate, 4.0 g of acrylic acid and 2.6 g of di-t-butyl peroxide were reacted with one another by a process analogous to that described in Example 1. The resulting colorless, semi-solid terpolymer had an acid number of 10 mg of KOH/g and a hydrolysis number of about 205 mg of KOH/G.

EXAMPLE 3

Preparation of a $C_{24}-C_{60}$-α-olefin/arylic acid/methyl acrylate/styrene polymer 500 9 of $C_{24}-C_{60}$-α-olefin were reacted with a mixture of 175.0 g of methyl acrylate, 47 g of styrene and 16.0 g of acrylic acid in the presence of 5.0 g of t-butylbenzoate analogously to Example 1.

A colorless wax having the following characteristic data was obtained: acid number 16 mg of KOH/g; hydrolysis number 161 mg of KOH/g; dropping point 72° C.; melt viscosity 390 mPa.s (measured at 90° C.).

EXAMPLE 4

The copolymers according to Example 1, 2 and 3 were tested for their transparency properties in the following recipe. A commercially available montan acid ester was used for comparison.

| | |
|---|---|
| S-PVC (K value about 60) | 100 parts by weight |
| Processing auxiliary containing acrylate | 1.0 part by weight |
| Octyltin stabilizer | 1.5 parts by weight |
| Glycerol monooleate | 0.3 part by weight |
| Test product | 0.6 part by weight |

These mixtures were plasticized on a roll mill at 190° C., and small sheets 0.5 and 2.0 mm thick were then pressed. These were tested with a transparency meter in neutral gray light.

| | Transparency in % | |
|---|---|---|
| Test product | 0.5 mm | 2.0 mm |
| Copolymer I (according to Example 1) | 76.8 | 66.7 |
| Copolymer II (according to Example 2) | 83.3 | 74.9 |
| Copolymer III (according to Example 3) | 83.7 | 67.5 |
| Ethylene glycol montanate (Hoechst Wachs E) | 69.6 | 41.6 |

EXAMPLE 5

The copolymers according to Example 1, 2 and 3 were tested for their release action in the following test recipe:

| | |
|---|---|
| B-PVC (K value about 57) | 100 parts by weight |
| MBS impact modifier | 8 parts by weight |
| Processing auxiliary containing acrylate | 1.2 parts by weight |
| Thiotin stabilizer | 1.6 parts by weight |
| Epoxidized soybean oil | 1.0 part by weight |
| Glycerol monooleate | 0.3 part by weight |
| Test product | 0.6 part by weight |

Testing was carried out on a roll mill at 190° C. and 15/20 rpm. The test was stopped when the rolling hide became brown in color.

| Test product | Tack-free time | Final stability |
|---|---|---|
| Copolymer I (according to Example 1) | 27 min | 30 min |
| Copolymer II (according to Example 2) | 30 min | 30 min |
| Copolymer III (according to Example 3) | 22 min | 35 min |
| Ethylene glycol montanate (Hoechst Wachs E) | 16 min | 35 min |

EXAMPLE 6

A PVC compound having the following composition

| | |
|---|---|
| S-PVC, K value about 58 | 100.0 parts by weight |
| Liquid zinc stabilizer | 0.1 part by weight |
| Calcium stearate | 0.3 part by weight |
| Costabilizer (β-diketone) | 0.3 part by weight |
| Epoxidized soybean oil (ESO) | 3.0 parts by weight |
| MBS impact modifier | 8.0 parts by weight |
| Processing auxiliary containing acrylate | 1.0 part by weight |
| Glycerol monooleate | 1.0 part by weight |
| Brightening agent (blue pigment) | 2.0 parts by weight |
| Test product | 1.2 parts by weight | was milled on a roll mill at 190° C. for 5 minutes. Samples of the hide were then taken and tested for their yellowness index (YI) with a colorimeter.

| Test product | YI |
|---|---|
| Copolymer I (according to Example 1) | −31.8 |
| Copolymer II (according to Example 2) | −31.4 |
| Copolymer III (according to Example 3) | −29.0 |
| Ethylene glycol montanate (Hoechst Wachs E) | −27.2 |

EXAMPLE 7

A PVC compound having the composition

| | |
|---|---|
| E-PVC (K value about 78) | 100.0 parts by weight |
| Diphenylthiourea | 0.5 part by weight |
| Test product | 3.0 parts by weight | was milled on a roll mill at 190° C. and 15/20 rpm. The time taken for complete formation of a homogeneous rolling hide (hide formation time) was determined.

| Test product | Hide formation time (minutes) |
|---|---|
| Copolymer I (according to Example 1) | 1.0 |
| Copolymer II (according to Example 2) | 1.0 |
| Ethylene glycol montanate (Hoechst Wachs E) | 4.0 |

We claim:

1. A method for improving the flow properties of a thermoplastic composition or for reducing the tendency of the thermoplastic composition to stick to a metallic component of a processing machine, comprising the step of:
    adding to the thermoplastic composition a copolymer comprising
    20 to 99.5 parts by weight of units which are derived form a $C_{12}$-$C_{60}$-α-olefin,
    0.5 to 50 parts by weight of units which are derived from a carboxylic acid of the formula $CH_2$=$CR^1$—COOH,
    0.1 to 60 parts by weight of units which are derived a carboxylic acid ester of the formula $CH_2$=$CR^1$—$COOR^2$, in which formulae $R^1$ is a hydrogen atom or a methyl group and $R^2$ is a straight-chain or branched alkyl radical having 1 to 6 carbon atoms, and
    0.0 to 30 parts by weight of units which are derived from styrene, 3-methylstyrene, 4-methylstyrene or α-methylstyrene.

2. A method as claimed in claim 1, wherein the amount of the copolymer added to 0.05 to 5% by weight, based on the thermoplastic composition.

3. A method as claimed in claim 1, wherein the thermoplastic is in the molten state when it is caused to flow or when it is processed by a said processing machine.

4. A method as claimed in claim 1, in which the α-olefin is a $C_{18}$ to $C_{60}$-α-olefin.

5. A method as claimed in claim 1, in which the α-olefin is a $C_{24}$ to $C_{60}$-α-olefin.

6. A method as claimed in claim 1, in which the carboxylic acid ester of the formula $CH_2=CR^1-COOR^2$ is an ester wherein $R^1$ is a hydrogen atom or a methyl group and $R^2$ is a methyl or an ethyl group.

7. A method as claimed in claim 1, wherein said $C_{12}-C_{60}$-α-olefin contains internal and lateral olefinic double bonds.

8. A method as claimed in claim 1, wherein said $C_{12}-C_{60}$-α-olefin is a mixture of olefins.

* * * * *